(12) United States Patent
Siegel et al.

(10) Patent No.: US 10,834,149 B2
(45) Date of Patent: Nov. 10, 2020

(54) METHOD AND SYSTEM FOR ROUTING OF SESSION-BASED SERVICES

(71) Applicant: AT & T Intellectual Property I, L.P., Atlanta, GA (US)

(72) Inventors: Steven A. Siegel, Mendham, NJ (US); Leopold B. Strahs, Williamsburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1324 days.

(21) Appl. No.: 14/570,534

(22) Filed: Dec. 15, 2014

(65) Prior Publication Data

US 2016/0173539 A1 Jun. 16, 2016

(51) Int. Cl.
*H04L 29/06* (2006.01)
*G06F 16/951* (2019.01)
*G06F 16/2457* (2019.01)

(52) U.S. Cl.
CPC .... *H04L 65/1073* (2013.01); *G06F 16/24575* (2019.01); *G06F 16/951* (2019.01); *H04L 65/1016* (2013.01); *H04L 65/1069* (2013.01)

(58) Field of Classification Search
CPC ............. H04L 65/1073; H04L 65/1016; H04L 65/1069; G06F 17/30864; G06F 17/30528
See application file for complete search history.

(56) References Cited

U.S. PATENT DOCUMENTS

| | | | |
|---|---|---|---|
| 7,948,965 B1 * | 5/2011 | Croak | H04L 65/1073 370/351 |
| 7,953,080 B2 | 5/2011 | Lubbers et al. | |
| 8,432,872 B2 | 4/2013 | Swaminathan | |
| 9,094,693 B1 * | 7/2015 | Otero | H04W 4/08 |
| 2006/0077965 A1 * | 4/2006 | Garcia-Martin | H04M 3/42195 370/352 |
| 2006/0098621 A1 * | 5/2006 | Plata Andres | H04L 29/1215 370/352 |
| 2008/0101340 A1 * | 5/2008 | Bernath | H04L 12/14 370/352 |
| 2008/0147806 A1 | 6/2008 | Robbie et al. | |

(Continued)

FOREIGN PATENT DOCUMENTS

WO 2007081111 7/2007

OTHER PUBLICATIONS

Luo et al., "System Support for Scalable, Reliable and Highly Manageable Web Hosting Service", Manageable Web Hosting Service., USITS. 2001,,12 ppgs.

(Continued)

*Primary Examiner* — Philip J Chea
*Assistant Examiner* — Wuji Chen
(74) *Attorney, Agent, or Firm* — Amin, Turocy & Watson, LLP

(57) ABSTRACT

A method including receiving a request for a communication session with a recipient having a recipient identifier; querying a subscription database for subscription information for the recipient; receiving, from the subscription database, the subscription information for the recipient; selecting one of a plurality of service processing elements based on the subscription information for the recipient; and sending the communication session to the one of the service processing elements based on subscription information received from the subscription database.

19 Claims, 2 Drawing Sheets

(56) References Cited

U.S. PATENT DOCUMENTS

| | | | |
|---|---|---|---|
| 2008/0162637 A1* | 7/2008 | Adamczyk | H04L 51/043 709/204 |
| 2008/0305794 A1* | 12/2008 | Mukaiyama | H04L 65/1046 455/435.1 |
| 2009/0122792 A1* | 5/2009 | Seno | H04L 12/66 370/352 |
| 2009/0213844 A1* | 8/2009 | Hughston | H04M 3/4872 370/352 |
| 2010/0208648 A1* | 8/2010 | Narkar | G06F 16/487 370/328 |
| 2011/0047084 A1 | 2/2011 | Manzalini et al. | |
| 2012/0282879 A1* | 11/2012 | Smith | H04W 72/10 455/404.1 |
| 2013/0019012 A1* | 1/2013 | Henrikson | H04L 65/1016 709/225 |
| 2013/0272253 A1* | 10/2013 | Veenstra | H04W 72/0486 370/329 |
| 2014/0099911 A1* | 4/2014 | Smith | H04W 72/10 455/404.1 |
| 2014/0136481 A1* | 5/2014 | Quan | H04W 4/023 707/617 |
| 2015/0358789 A1* | 12/2015 | Bendi | H04W 4/14 455/466 |

OTHER PUBLICATIONS

Schmidt et al., "*Roaming Real-Time Applications-Mobility Services in IPv6 Networks*", arXiv preprint cs/0408002, 2004, 15 pps.

\* cited by examiner

METHOD AND SYSTEM FOR ROUTING OF SESSION-BASED SERVICES

BACKGROUND

IP-based communications are increasingly common and can take a variety of forms. Under existing IP-based routing techniques, when sessions are to be routed to a user who may be associated with zero or more addressable clients through "registrations," sessions are routed by querying a data source storing both subscription information and registration information for the recipient. However, because the large amount of data involved and frequency that such data is updated, these routing techniques may scale inefficiently when a large number of potential recipients are served.

SUMMARY OF THE DISCLOSURE

A method includes receiving a request for a communication session with a recipient having a recipient identifier; querying a subscription database for subscription information for the recipient; receiving, from the subscription database, the subscription information for the recipient; selecting one of a plurality of service processing elements based on the subscription information for the recipient; and sending the communication session to the one of the service processing elements based on subscription information received from the subscription database.

A system includes a service selector element, a user to service processing element database, a plurality of service processing elements, and a plurality of databases. The service selector element receives, from an IP network, an incoming communication session for a recipient. The incoming communication session includes a recipient identifier. The user to service processing element database stores subscription information for a plurality of users. The user to service processing element database receives, from the service selector element, a subscription query corresponding to the incoming communication session. The subscription query includes the recipient identifier. The user to service processing element database sends, to the service selector element, subscription information for the recipient. The service selector element selects one of the service processing elements based on the subscription information for the recipient and sends the incoming communication session to the one of the service processing elements. Each of the databases stores registration information for a subset of the plurality of users. One of the databases receives, from the one of the service processing elements, a registration query for the recipient. The one of the databases sends, to the one of the service processing elements, registration information for the recipient. The one of the service processing elements selects one of a plurality of border elements based on the registration information and sends the communication session to the one of the plurality of border elements.

A tangible computer-readable storage medium includes a set of instructions executable by a processor. The set of instructions, when executed by the processor, causes the processor to perform operations comprising receiving, from an IP network, an incoming communication session for a recipient, the incoming communication session including a recipient identifier; querying a user to service processing element database that stores subscription information for a plurality of users, the query including the recipient identifier; receiving, from the user to service processing element database, subscription information for the recipient; selecting one of a plurality of service processing elements based on the subscription information; and sending the incoming communication session to the one of the service processing elements.

DETAILED DESCRIPTION

Figure 1:
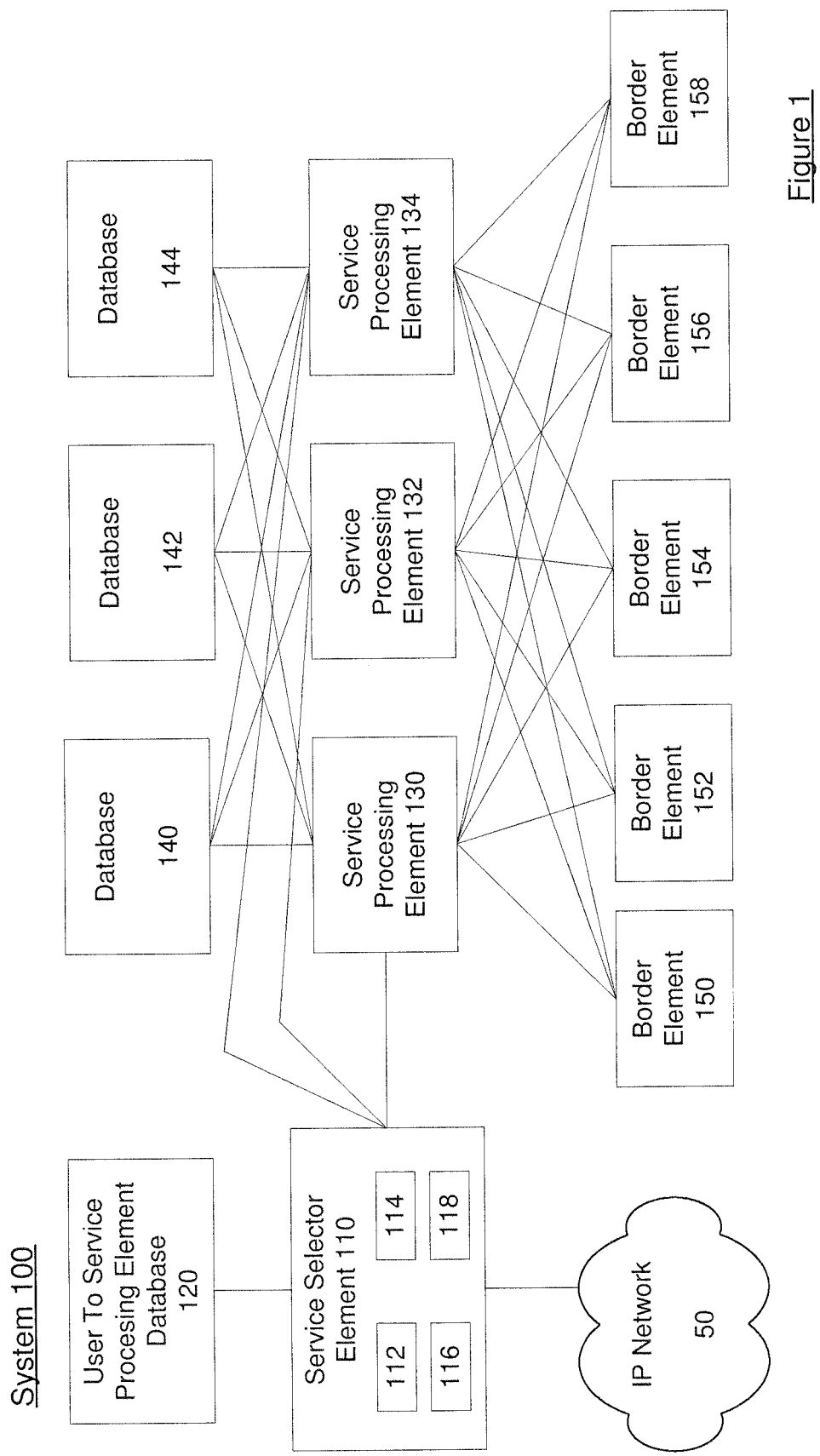
FIG. 1 schematically illustrates a system for routing incoming IP-based communication sessions to a recipient according to an exemplary embodiment.

The exemplary embodiments may be further understood with reference to the following description and the related appended drawings, wherein like elements are provided with the same reference numerals. Specifically, the exemplary embodiments relate to methods and systems for routing session-based communication services in a scalable manner.

IP-based communication services need to be routed through functions that have access to data about how and where the receiving party wishes to be reached; this data is typically called "registration" data. One example is IP Multimedia Subsystem ("IMS"), an IP-based communications subsystem that typically involves the routing of sessions through one or more call session control function servers, typically referred to as "CSCFs". In IMS, incoming communication session requests may be received at an IMS-specific service access point such as an interrogating CSCF ("I-CSCF"). The incoming communication session may include a recipient identifier, which may be formatted according to one of a variety of uniform resource identifier ("URI") schemes. One common URI scheme is a tel URI, in which the recipient identifier is a telephone number, which may be formatted according to a standard such as the "International Public Telecommunication Numbering Plan" defined by the International Telecommunication Union ("ITU"), commonly referred to as the E.164 standard. Another common URI scheme is a SIP URI, in which the recipient identifier is in a format similar to an email address.

For IMS, in cases where the session received at the I-CSCF includes a tel URI, the I-CSCF may first query an electronic numbering database ("ENUM") to translate the tel URI to a corresponding SIP URI. After this has been done, or if the originally received identifier was a SIP URI, the I-CSCF then accesses a database including both subscription information (sometimes alternatively referred to as provisioned information) and registration information, such as a Home Subscriber Server database ("HSS"), to find whether the calling party is registered and to find a service processing element (e.g., the correct serving CSCF, or "S-CSCF") at which the registration data for the recipient is kept, and to which the session should be routed. In the case where a large network has been built from regional IMS networks, previous solutions use a signaling network with routing servers to tie several HSS nodes and make them appear as one logical network.

It will be apparent to those of skill in the art that this is a request for location information for the recipient's processing element, and that the response will consequently include routing information to that element (e.g., S-CSCF). In cases where the recipient is already a registered user of the service, the response may be the identity of an S-CSCF servicing the recipient, and to which the session should be directed. In cases where the recipient is not yet registered with an S-CSCF, the response may be an instruction to the I-CSCF to select an S-CSCF. In cases where the user has no right to receive the requested service, the response may be a denial. Once this response has been received, and assuming the response is not a denial, the I-CSCF sends the session to the appropriate S-CSCF. The S-CSCF then provides services subscribed to by the recipient (by sending the message for processing and return to SIP application servers) and then connects the SIP to appropriate user equipment (e.g., one or more of, potentially, a plurality of equipment with separate registrations), which may vary depending on the nature of the session, to initiate communication with the recipient.

However, the existing approach to routing IP-based communications sessions suffers from deficiencies. Among these deficiencies is a lack of scalability in two major areas. First, under the existing approach, both subscription information and user registration information are stored in a central location, such as the S-CSCF described above. The S-CSCF, acting as Registrar, has the registration data. It can also get subscription data (the user profile) from the HSS. The registration data in the HSS includes whether the user is registered and which S-CSCF has that information. This means the data changes when a user's registration state changes, and hence is more dynamic than pure subscription data. Thus, all incoming calls need access to this dynamic data, and in large networks a complex signaling network is typically required to provide access.

The second deficiency is the fact that the detailed registration information, which is a large volume of information and also changes often due to changes in device status (e.g., when a mobile device connects to a network, when a user connects to a VoIP application, etc.), is stored together with call processing instructions in a single location, such as the S-CSCF described above. This approach does not allow easy scaling by creating additional instantiations of the S-CSCF, because the amount of data that would be needed to be replicated may be huge. Additionally, because a traditional service processing element such as an S-CSCF may be a hardware element dedicated to processing specific types of sessions, the adaptability of the overall architecture to new types of communications may be limited.

The exemplary embodiments provide a service architecture and accompanying call routing method that may overcome deficiencies of the previously existing techniques described above. FIG. 1 schematically illustrates a system 100 for routing IP-based communication sessions in an efficient and scalable manner. The system 100 includes a service selector element 110 that may receive incoming sessions over an IP network 50 (e.g., the Internet). There may be an element between the public Internet and the service provider's network to which the service selector element 110 belongs. This element protects the network and may convert protocols from those used at the message origination to those used by the terminating network. Examples of this element include an Interconnect Session Border Controller ("I-SBC") when the protocols of the two networks are the same, or a gateway such as a Circuit Switched Gateway when the networks use different signaling. As described above, an incoming communication session may include, among other types of data, a recipient identifier. The recipient identifier may be a telephone number (e.g., a tel URI in the E.164 format) or a SIP URI (e.g., an address formatted in the manner of an email address), though it will be apparent to those of skill in the art that these are only exemplary and that other types of recipient identifier may also be used.

The service selector element 110 may be a computing system including a combination of hardware and software to perform the functions described herein. The service selector element 110 may include a data storage element 112 (e.g., one or more hard drives, solid state drives, or other persistent data storage components). The data storage element 112 may store code instructing the service selector element 110 to perform the functions described herein. The service selector element 110 may also include a processing element 114, which may include one or more microprocessors capable of executing code. The service selector element 110 also includes a user interface 116, which may comprise one or more physical components (e.g., a keyboard, mouse, touchpad, display, touchscreen, etc.) operable to receive user inputs and provide results to a user. The service selector element 110 may also include a data interface 118 (e.g., a wired or wireless connection to a network and/or to the Internet) providing for communications with further elements, such as the other elements of the system 100. It will be apparent to those of skill in the art that the service selector element 110 may include additional elements not specifically described above.

The system 100 also includes a User To Service Processing Element Database 120. The User To Service Processing Element Database 120 stores, for each of a plurality of users provisioned to be serviced by the system 100, data indexing the user's recipient identifier to a service processing element for the user. For IMS, the mapping would be to the individual IMS system's S-CSCF, which is part of the Service Processing Element. The User to Service Processing Element Database 120 may be adapted to receive incoming queries with a variety of types of recipient identifiers, including an E.164 identifier, a SIP URI, or other types not expressly discussed herein. In some embodiments, and/or for some users, the User to Service Processing Element Database 120 may include multiple service processing elements for a given user, with one of the service processing elements being selected for a given incoming session based on the type of the session. For example, a given user may have an incoming session routed to a first service processing element if the incoming session is a voice session, to a second service processing element if the incoming session is a video chat, etc. Over time, the User To Service Processing Element Database 120 may change which service a given identifier is mapped to. For example, a customer with basic service may subscribe to a service that involves routing based on the location of a given handset. Routing rules may be different depending on whether the handset is at home or away from home, stationary or moving. By allowing this mapping at the Service Selector Element, the tight relationship between the SIP URI and the actual Service Processing Element chosen is decoupled; as a result, the Service Processing Element is decoupled from the registration data and the identifier, but is the result of a lookup in the User To Service Processing Element Database 120. It will be apparent to those of skill in the art that the information described above with reference to the User To Service Processing Element Database 120 is subscription information, which, for practical purposes, differs from registration information in that it changes less frequently. Correspondingly, the User To Service Processing Element Database 120 may be thought of as a subscription database.

The system 100 also includes a plurality of service processing elements 130, 132 and 134. It will be apparent to those of skill in the art that the inclusion of three service processing elements 130, 132 and 134 is only exemplary and that this quantity may vary among differing implementations; for example, in a real-life system, there may be a significantly greater quantity. In one exemplary embodiment, the service processing elements 130, 132 and 134 may be interrogating/servicing CSCFs ("I/S-CSCFs") and connected IMS application servers, or service processing elements based on alternate internal architectures, including simple SIP servers. The service processing elements 130, 132 and 134 may comprise a combination of software and hardware, and may each be service-specific entry points that are dedicated to handling a specific type of communication session for a plurality of users. Thus, the query to the User To Service Processing Element Database 120, may inform the selection of a specific one of the service processing elements 130, 132 and 134 to which an incoming session should be directed. Additionally, the service processing elements 130, 132 and 134 may be separated geographically; for example, they may provide the same service, but to users in different geographical areas. There may be multiple service processing elements that provide the same service processing, while there may be elements that provide different service processing. The capability to have multiple elements with the same processing allows for easier scaling (e.g., introduction of additional elements or virtual functions).

Each of the service processing elements 130, 132 and 134 may be in communication with a corresponding one of a plurality of databases 140, 142 and 144. Each of the databases 140, 142 and 144 may store registration information for the plurality of users and provide that information when queried by service processing elements 130, 132 and 134. The databases are not required to be dedicated or partitioned so that the service processing elements 130, 132 and 134 relates uniquely to a specific one of the databases 140, 142 and 144. One of the service processing elements 130, 132 and 134 may find the one of the databases 140, 142 or 144 that has the registration information for the user it is serving. As described above, and as will be known to those of skill in the art, registration information may be understood to include the specific identity and location of the user devices currently operated to receive various types of sessions. For example, a given user may possess both a tablet device and a notebook computer device that are capable of serving as the user equipment that receives a video chat session, and both may be provisioned to do so through the service provider of the system 100. Registration information may include whether the registration is active, the priority of the registration compared to others, and any additional information about the registration that may be used for routing (e.g., whether the registration supports video communication). This information can be changed by the user by registering with different options or metadata from the same device, replacing the previous registration. The service processing elements 130, 132 and 134 may then use the registration information stored at the one of the databases 140, 142 and 144 with the relevant registration information to appropriately route incoming sessions to users.

The system 100 also includes a plurality of border elements 150, 152, 154, 156 and 158. As noted above with reference to the service processing elements 130, 132 and 134, the inclusion of five border elements 150, 152, 154, 156 and 158 is only exemplary and that this quantity may vary among differing implementations; for example, in a real-life system, there may be a significantly greater quantity. The border elements 150, 152, 154, 156 and 158 may be network endpoints within the system 100 that communicate directly with recipient user equipment. In an embodiment that is specific to IMS, the border elements 150, 152, 154, 156 and 158 may be proxy CSCFs ("P-CSCFs"). The registration information provided to the service processing elements 130, 132 and 134 by the one of the databases 140, 142 and 144 with relevant registration information may enable the selection of the proper one of the border elements 150, 152, 154, 156 and 158 to which an incoming session should be routed at a given time.

Figure 2:
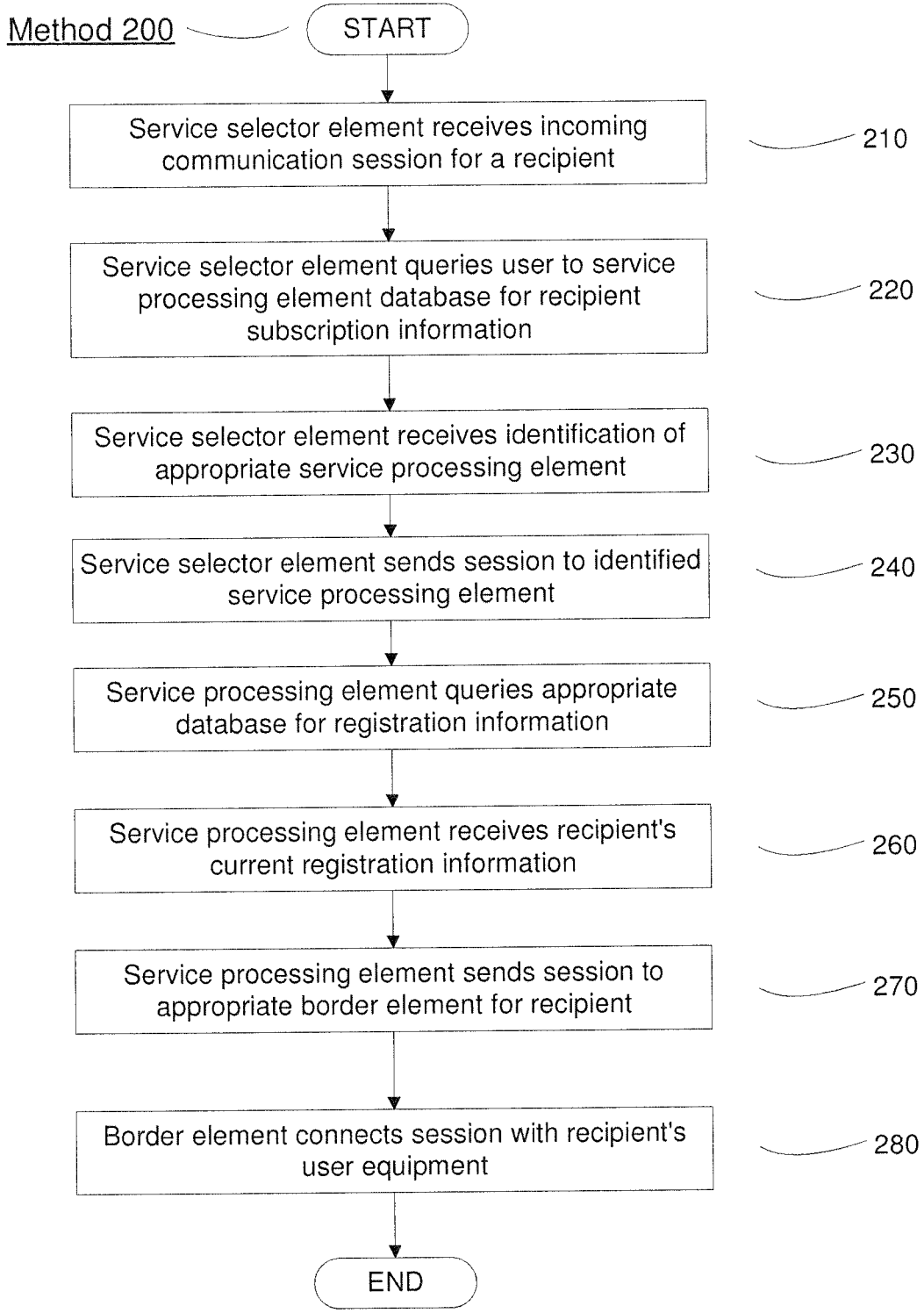
FIG. 2 shows an exemplary method for routing incoming IP-based communication sessions to a recipient using a system such as the exemplary system of FIG. 1.

FIG. 2 illustrates an exemplary method 200 for routing an incoming IP-based communication session to its recipient. The method 200 will be described with specific reference to the elements of the system 100, but those of skill in the art will understand that this is only exemplary and that the method 200 may be performed by any suitable components. In step 210, the service selector element 110 receives an incoming communication session. Typically, this session may be received via an IP network 50 such as the Internet, but the session may also arrive through any other means (e.g., via a local network connected to the Internet, etc.) of conveying an IP-based communication session. The incoming communication session may be any type of session that may be transmitted via an IP network 50 (e.g., a voice call, a video call, a text-based message, etc.), and may be sent in accordance with any appropriate corresponding protocol known in the art.

The incoming communication session includes a recipient identifier identifying the message's intended recipient. The recipient identifier may be in the format of a SIP URI (e.g., formatted in the manner of an email address), in the format of a tel URI (e.g., formatted in the manner of a telephone number in accordance with the E.164 standard), a protocol-specific identifier, or any other appropriate identifier for the recipient. The identifier may be generalized or may be service-specific. The incoming communication may also include other pertinent information (e.g., an identifier for the originator of the communication, a subject, a time stamp, a priority indication, etc.), but the remainder of the information accompanying the communication is beyond the scope of the exemplary embodiments and will not be discussed in further detail hereinafter.

In step 220, the service selector element 110 queries the User To Service Processing Element Database 120 for recipient subscription information indicating the service (e.g., text, voice, etc.) needed to process the incoming communication session. The query may include the recipient identifier and the type of incoming session. The query may also include other types of data, but any other data included in the query is beyond the scope of the exemplary embodiments and will not be discussed in further detail hereinafter. As described above, the User To Service Processing Element Database 120 stores data relating to the specific service processing elements providing, to a plurality of users, each of a plurality of services. For example, for the user who is the recipient of the incoming session, the User To Service Processing Element Database 120 may indicate that voice calls are serviced through service processing element 130, while video chat sessions are serviced through service processing element 132. For another user, the User To Service Processing Element Database 120 may indicate that voice calls are serviced through service processing element 130, while video chat sessions may be serviced through service processing element 134 due to the user receiving a different type of video chat. It will be apparent to those of skill in the art that the above is only exemplary and that a practical implementation of a User To Service Processing Element Database 120 will include information for a significantly greater number of users, a wider and/or different variety of services, and a greater quantity of service processing elements.

In step 230, the service selector element 110 receives, from the User To Service Processing Element Database 120, subscription information including the identity of the appropriate one of the service processing elements 130, 132 and 134 to which the incoming session should be routed or information that can be used by the service selector element 110 to choose one of the service processing elements 130, 132 or 134. For example, the subscription information may indicate that multimedia calls to the recipient must be processed by a specified service. Identification of the specific one of the service processing elements 130, 132 or 134 that provides the specified service may be accomplished by a different element; while this information may be stored in User To Service Processing Element Database 120, in other embodiments it could be resident at service selector element 110, or could be obtained using a lookup (e.g., DNS) by the service selector element 110 or another element. Considering the exemplary User To Service Processing Element Database 120 described above, the incoming session may be a video chat session, and the response from the User To Service Processing Element Database 120 may therefore indicate to the service selector element 110 that the session should be routed to service processing element 132. In some cases, the response may also include a service-specific recipient identifier; in these cases, the service selector element 110 may substitute a service-specific recipient identifier from the general recipient identifier that was originally received with the incoming session. Additionally, in some cases, the response may indicate the location of a virtual function located somewhere in the system 100.

In step 240, the service selector element 110 sends the incoming session to the one of the service processing elements 130, 132 and 134 that was indicated by the User To Service Processing Element Database 120 in step 230 as being appropriate for the recipient and the type of service. This may be accomplished using any protocol that is appropriate for the type of communication session involved, and over any type of connection capable of handing an IP-based communication session (e.g., the Internet, an intranet, etc.). Continuing with the example discussed above with reference to step 230, this may be service processing element 132.

In step 250, the one of the service processing elements 130, 132 and 134 that received the incoming session from the service selector element 110 in step 240 contacts the appropriate one of the databases 140, 142 and 144 to obtain current registration information for the recipient of the session. In some embodiments, the appropriate one of the databases 140, 142 and 144 may be selected by the one of the service processing elements 130, 132 and 134 (e.g., service processing element 132) based on the identity of the recipient. In other embodiments, the one of the service processing elements 130, 132 and 134 may query an intervening routing element, which may select the appropriate source for the requested information. This step may be performed using a service-specific recipient identifier, if one was obtained in step 230. Continuing with the example discussed above, this step may be performed by service processing element 132, which may contact database 144. It will be apparent to those of skill in the art that, in addition to registration information, the one of the service processing elements 130, 132 and 134 may obtain additional types of user data. This may include a destination for call forwarding, a list of permitted calling parties, or any other information that is recipient-specific and needed by the service.

In step 260, the service processing element (e.g., service processing element 132) receives from the appropriate database (e.g., database 144) current registration information for the recipient, as well as other relevant data as described above with reference to step 250. As will be understood by those of skill in the art, registration information may be information that indicates the recipient's current location within a network, active devices, online/offline status, whether the endpoint supports video, etc. Registration information may also include the identity a border element (e.g., one of the border elements 150, 152, 154, 156 and 158) within the system 100 to which the recipient's user equipment is currently connected, to properly route an incoming communication session to the recipient.

In step 270, the service processing element (e.g., service processing element 132) sends the call to the appropriate one or more of the border elements (e.g., border element 156) that was identified by the relevant database (e.g., database 144) in step 260. Because the border elements are the last point in the network before connecting to the user equipment, the appropriate border element will vary based on the type of connection, the type of user equipment, the user's current connection to the network, etc. The sending of step 270 may be accomplished using any protocol that is appropriate for the type of communication session involved, and over any type of connection capable of handing an IP-based communication session (e.g., the Internet, an intranet, etc.). In step 280, the border element (e.g., border element 156) to which the incoming session was sent in step 270 connects the session with the user equipment. Because the border element to which the session is sent was selected based on registration information stored at the appropriate database containing relevant registration information for the recipient (e.g., database 144), this border element will be one to which the recipient is currently connected and that is appropriate for the nature of the incoming communication session.

For example, a given user who is a subscriber to services provided by an operator of the system 100 may possess multiple user devices including a smart phone and a desktop computer, both of which are in communication with the system 100. The user's current registration information may indicate that the user wishes to have voice calls routed to the smart phone and video chats routed to the desktop computer. The user's current registration information may further indicate that the smart phone is communicating with border element 150 (e.g., a connection point to a cellular data network), while the desktop computer is communicating with border element 156 (e.g., a cable modem in the user's home). Thus, if the incoming session is a video chat, a registration associated with border element 156 would be selected based on information provided by the database with registration information that is appropriate for the recipient. Following step 280, the session has been connected from sender to recipient, and the method 200 terminates.

The exemplary embodiments described above with reference to FIGS. 1-2 may provide routing of various types of IP-based communication sessions to their recipients. Those of skill in the art will understand that the above-described exemplary embodiments may be implemented in any number of matters, including as a software module, as a combination of hardware and software, etc. For example, the exemplary method 200 may be embodied in a program stored in a tangible storage medium and containing lines of code that, when compiled, may be executed by a processor. As used herein, a tangible storage medium is a non-transitory, physical data storage medium. The exemplary embodiments have been described herein with reference to the elements of IP networks providing IMS services. However, it will be apparent to those of skill in the art that the broader principles described by the exemplary embodiments may be equally applicable to IP networks providing communications services using specifications other than IMS, or to implementations providing for communications services using a protocol other than IP.

It will be apparent to those skilled in the art that various modifications may be made to the exemplary embodiments, without departing from the spirit or the scope of the disclosure. Thus, it is intended that the present disclosure cover modifications and variations of this disclosure provided they come within the scope of the appended claims and their equivalents.

What is claimed is:

1. A method, comprising:
   receiving a request for a communication session with a recipient having a recipient identifier;
   querying a subscription database for subscription information for the recipient;
   receiving, from the subscription database, the subscription information for the recipient, wherein the subscription information indicates a service used to process the communication session;
   selecting one of a plurality of service processing elements based on the subscription information for the recipient;
   sending the communication session to the one of the service processing elements based on the subscription information received from the subscription database; and
   querying, by the one of the service processing elements, one of a plurality of databases to retrieve registration information for the recipient, wherein the subscription information is stored in a different database than the registration information, wherein the registration information comprises a specific identity and location of a user equipment of the recipient, whether a registration is active, a priority of the registration compared to others, and routing information for the registration.

2. The method of claim 1, wherein the one of the service processing elements is a service processing element that is specific to a type of the communication session.

3. The method of claim 2, wherein the subscription information comprises a service-specific recipient identifier, and wherein the communication session is sent to the one of the service processing elements using the service-specific recipient identifier.

4. The method of claim 1, wherein the one of the service processing elements sends the communication session to a border element, the border element being selected from a plurality of border elements based on the registration information.

5. The method of claim 4, wherein the border element sends the communication session to the user equipment of the recipient.

6. The method of claim 1, wherein the service processing elements are interrogating/serving call session control function servers.

7. The method of claim 1, wherein the recipient identifier is one of a tel URI and a SIP URI.

8. The method of claim 1, wherein each of the service processing elements provides service for a corresponding one of a plurality of geographic areas.

9. The method of claim 1, wherein each of the service processing elements is service type specific.

10. A system, comprising:
    a processor receiving, from an IP network, an incoming communication session for a recipient, the incoming communication session including a recipient identifier;
    a first database storing subscription information for a plurality of users, wherein the subscription information indicates a service used to process the communication session the first database receiving, from the processor, a subscription query corresponding to the incoming communication session, the subscription query including the recipient identifier, and sending, to the processor, the subscription information for the recipient;
    a plurality of call session control function (CSCF) servers, wherein the processor selects one of the CSCF servers based on the subscription information for the recipient and sends the incoming communication session to the one of the CSCF servers;
    a plurality of databases, each of the databases storing registration information for a subset of the plurality of users, one of the databases receiving, from the one of the CSCF servers, a registration query for the recipient, and the one of the databases sending, to the one of the CSCF servers, registration information for the recipient, wherein the registration information comprises a specific identity and location of a user equipment of the recipient, whether a registration is active, a priority of the registration compared to others, and routing information for the registration,
    wherein the first database storing the subscription information is a different database than each of the plurality of databases storing the registration information, and
    wherein the one of the CSCF servers selects one of a plurality of border elements based on the registration information and sends the incoming communication session to the one of the plurality of border elements.

11. The system of claim 10, wherein the one of the CSCF servers is a CSCF server that is specific to a type of the incoming communication session.

12. The system of claim 11, wherein the subscription information comprises a service-specific recipient identifier, and wherein the incoming communication session is sent to the one of the CSCF servers using the service-specific recipient identifier.

13. The system of claim 10, wherein the border element sends the incoming communication session to the user equipment of the recipient.

14. The system of claim 10, wherein the CSCF servers are interrogating/serving call session control function servers.

15. The system of claim 10, wherein the recipient identifier is one of a tel URI and a SIP URI.

16. The system of claim 10, wherein each of the plurality of CSCF servers provides service for a corresponding one of a plurality of geographic areas.

17. The system of claim 10, wherein each of the CSCF servers are service type specific.

18. A tangible computer-readable storage medium including a set of instructions executable by a processor, the set of instructions, when executed by the processor, causing the processor to perform operations comprising:
    receiving, from an IP network, an incoming communication session for a recipient, the incoming communication session including a recipient identifier;
    querying a first database that stores subscription information for a plurality of users, the query including the recipient identifier;

receiving, from the first database, the subscription information for the recipient, wherein the subscription information indicates a service used to process the communication session;

selecting one of a call session control function (CSCF) servers based on the subscription information;

sending the incoming communication session to the one of the CSCF servers; and querying one of a plurality of databases to retrieve registration information for the recipient, wherein the subscription information is stored in a different database than the registration information, wherein the registration information comprises a specific identity and location of a user equipment of the recipient, whether a registration is active, a priority of the registration compared to others, and routing information for the registration.

19. The tangible computer-readable storage medium of claim 18, wherein the one of the CSCF servers selects one of a plurality of border elements based on the registration information, and sends the incoming communication session to the one of the border elements.

\* \* \* \* \*